United States Patent
Law et al.

(10) Patent No.: US 10,804,969 B1
(45) Date of Patent: Oct. 13, 2020

(54) BUILT-IN VOLTAGE DOUBLER IN A MICROCONTROLLER UNIT OF A ONE-CELL BATTERY REMOTE FOR LONG-DISTANCE INFRA-RED (IR) AND LOW-POWER BLUETOOTH LOW ENERGY (BLE) TRANSMISSION

(71) Applicants: Fu Yiu Law, Hong Kong (HK); Tak Sum Patrick Chan, Hong Kong (HK)

(72) Inventors: Fu Yiu Law, Hong Kong (HK); Tak Sum Patrick Chan, Hong Kong (HK)

( * ) Notice: Subject to any disclaimer, the term of this patent is extended or adjusted under 35 U.S.C. 154(b) by 0 days.

(21) Appl. No.: 16/829,006

(22) Filed: Mar. 25, 2020

Related U.S. Application Data

(60) Provisional application No. 62/822,993, filed on Mar. 25, 2019.

(51) Int. Cl.
| | |
|---|---|
| *H04B 10/11* | (2013.01) |
| *H04B 5/00* | (2006.01) |
| *H04B 1/04* | (2006.01) |
| *G08C 17/02* | (2006.01) |

(52) U.S. Cl.
CPC ............ *H04B 5/0031* (2013.01); *G08C 17/02* (2013.01); *H04B 1/04* (2013.01); *H04B 2001/0416* (2013.01)

(58) Field of Classification Search
CPC ...... H04B 10/00; H04B 10/11; H04B 10/112; H04B 10/114
See application file for complete search history.

(56) References Cited

U.S. PATENT DOCUMENTS

| 9,413,472 B2 * | 8/2016 | Haynes | ................... F21V 23/00 |
| 2016/0189539 A1 * | 6/2016 | Lin | ......................... G08C 23/04 |
| | | | 398/108 |

FOREIGN PATENT DOCUMENTS

CN          105933534 A  *  9/2016  ............. H04B 10/50

* cited by examiner

*Primary Examiner* — Blane J Jackson

(57) ABSTRACT

Embodiments of the present invention provides a microcontroller unit for a short-range wireless transmission (such as IR or BLE) in a one-cell battery powered remote control comprising a voltage doubler for increasing an input voltage provided by the one-cell battery to increase distance of wireless transmission when the remote control is in use and for maintaining original output voltage when the remote control is idle; and a voltage detector for detecting voltage increased by the voltage doubler. The voltage doubler includes an oscillator, a logic control unit and multiple transistors with external capacitors connected to each other. When the voltage doubler is activated, the logic control unit turns on the multiple transistors on and off sequentially to increase the input voltage, at least twice, provided by the one-cell battery to increase the distance of the wireless transmission, and when the voltage doubler is deactivated, the original output voltage is maintained.

18 Claims, 7 Drawing Sheets

BUILT-IN VOLTAGE DOUBLER IN A MICROCONTROLLER UNIT OF A ONE-CELL BATTERY REMOTE FOR LONG-DISTANCE INFRA-RED (IR) AND LOW-POWER BLUETOOTH LOW ENERGY (BLE) TRANSMISSION

CROSS REFERENCE TO RELATED APPLICATIONS

The present application claims the benefit of U.S. Patent Application No. 62/822,993 filed on Mar. 25, 2019, the contents of which are incorporated herein by reference in their entirety.

FIELD OF THE INVENTION

The invention generally relates to a design and a method of use of a micro-controller unit with a built-in voltage doubler, a voltage detector, and a signal strength control system designed for a one-cell battery operated remote. More particularly, the invention relates to a microcontroller unit design including a voltage doubler that increases distance of a wireless transmission in a one-cell battery operated remote control, such as including Infra-red or Bluetooth Energy wireless transmission.

BACKGROUND

In a battery-operated remote controller unit, two-cell AA/AAA batteries and one-cell AA/AAA battery are the common source of power input. Typical batteries do not leak in normal storage or usage condition. However, the chance of battery leakage is potentially increased if batteries are subjected to charging, mixing of different brands or chemistries of batteries, or mixing of fresh and used batteries. Therefore, a two-cell battery remote controller unit is more prone to battery leakage because two batteries are subjected to charging, or due to variation of battery chemistry, or mix of use of fresh and used batteries. A one-cell battery remote controller unit can avoid all the scenarios above and thus can prevent battery chemical leakage, but the distance transmitted in IR transmission or BLE transmission is shortened compared to that of a two-cell battery remote.

Another advantage of one-cell battery remote over two-cell battery remote is being environment friendly and go green at the consumer market. In reality, only a very few percent of used batteries are recycled. Many are disposed as waste. The purpose of introducing one-cell battery remote to the market is to cut the disposal of chemical batteries by half. This act can save energy, save money, and save the recycling or disposal cost of used batteries.

However, if same design architecture of a two-cell battery remote microcontroller unit is adapted to a one-cell battery remote, the power is reduced by half. The IR transmission or BLE transmission distance will therefore be shortened by more than half, as per experimental results. The drawback is the remote has to be placed very close to the receiver end (television, set top box, fan, air-conditioner, etc.)

SUMMARY OF THE INVENTION

To solve the short-distance transmission problem in such wireless transmissions such as including IR transmission or BLE transmission, the first approach of this invention is to introduce a voltage doubler. When a key of the remote is detected to be pressed or pressing, the voltage doubler is switched on and drains twice the voltage level as normally drawn by one battery. The voltage drained is enough for transmitting an IR signal or a BLE signal that travels a similar distance as the signal from a two-cell remote battery. When the remote is not in use, the voltage doubler will be switched off to save standby power. Since remote is in idle state most of the time in normal usage, the additional power consumption by voltage doubler is not significant in overall remote application.

The second approach of this invention is to monitor the voltage pumped by voltage doubler, and adjusts the transmission power needed for IR transmission or BLE transmission. When battery level is detected full or a high level, some transistors for IR transmission or BLE transmission are turned off to save some power. When battery level is detected at low level, all transistors for the transmission are turned on to extend the transmission distance. This can further extend the battery life, while maintaining a certain level of power needed to transmit the IR signal or the BLE signal at a certain distance.

The objective of the invention is to save the cost of a battery in a remote controller while maintaining the same IR transmission or BLE transmission distance being achieved by a two-cell battery remote.

Another objective of the present invention is to develop environment friendly remote controls.

An aspect of the present invention provides a microcontroller unit for a short-range wireless transmission in a one-cell battery powered remote control comprising: a voltage doubler for increasing an input voltage provided by the one-cell battery to increase distance of wireless transmission when the remote control is in use and for maintaining original output voltage when the remote control is idle; and a voltage detector for detecting voltage increased by the voltage doubler, wherein the voltage doubler includes: an oscillator to provide a constant periodical switching signal source to a logic control unit to control increase in the input voltage; the logic control unit to implement one or more logic gate control signals to multiple transistors included in a one-stage charge pump; and the one-stage charge pump including the multiple transistors and at least two external capacitors connected, and wherein, when the voltage doubler is activated, the logic control unit turns on the multiple transistors on and off sequentially to increase the input voltage provided by the one-cell battery to increase the distance of the wireless transmission, and when the voltage doubler is deactivated, the original output voltage is maintained.

Another aspect of the present invention provides a method for operating a short-range wireless transmission in a one-cell battery powered remote control comprising: detecting, by a microcontroller unit included in the remote control, pressing of a key of the remote control; activating a voltage doubler, included in the remote control, for increasing an input voltage provided by the one-cell battery to increase distance of wireless transmission when the remote control is in use and for maintaining original output voltage when the remote control is idle; and detecting, by a voltage detector included in the remote control, voltage increased by the voltage doubler, wherein for increasing, by the voltage doubler, the input voltage provided by the one-cell battery, the voltage doubler: provides, by an oscillator included in the voltage doubler, a constant periodical switching signal source to a logic control unit, included in the voltage doubler, to control increase in the input voltage; implements, at the logic control unit, one or more logic gate control signals to multiple transistors included in a one-stage charge pump of the voltage doubler; and turns on, by the logic control unit, the multiple transistors on and off sequentially to increase the input voltage provided by the one-cell battery to increase the distance of the wireless transmission when the voltage doubler is activated, and wherein the one-stage charge pump includes the multiple transistors and at least two external capacitors connected, and one of the at least two external capacitors is placed across two external terminals of the voltage doubler for increasing the input voltage, while the other capacitor is connected across an output voltage terminal and ground terminal to maintain the output voltage at a steady uniform power supply, and wherein, when the voltage doubler is deactivated, the original output voltage is maintained at its value.

An embodiment of the present invention provides the microcontroller unit for the short-range wireless transmission in the one-cell battery powered remote control, and wherein the short-range wireless transmission either includes an Infrared transmission or a Bluetooth Low Energy transmission.

An embodiment of the present invention provides the voltage detector, of the microcontroller unit, when detects the input voltage to the voltage doubler at a range of: (a) below 2.4V, the voltage doubler turns on all the multiple transistors for increasing the input voltage at least twice and for achieving the distance of the wireless transmission in case of Infrared transmission; or indicates a "low-power battery" status in case of Bluetooth Low Energy transmission; (b) 2.4V-2.7V, the voltage doubler turns on at least three by fourth of the multiple transistors for increasing the input voltage at least twice and for achieving the distance of the wireless transmission in case of Infrared transmission; and (c) higher than 2.7V, the voltage doubler turns on at least half of the multiple transistors for increasing the input voltage at least twice and for achieving the distance of the wireless transmission in case of Infrared transmission, or the voltage doubler increases the input voltage at least twice for achieving the distance of the wireless transmission in case of Bluetooth Low Energy transmission.

BRIEF DESCRIPTION OF DRAWINGS

The invention can be more understood from the following detailed description of the preferred embodiments, with reference to the accompanied drawings listed below.

DETAILED DESCRIPTION

The present invention provides a device, a system and a method for a one-cell battery operated remote control which is able to achieve wireless transmission, such as including IR and BLE transmission by using at least only one-cell battery. The present invention discloses a combined hardware and software solution implemented in a microcontroller unit of the one-cell battery operated remote control. In an embodiment, the hardware comprises a voltage doubler, a voltage detector, built-in transistors for driving IR diode, and a central processing unit (CPU). In an embodiment, the software provides instructions for the controlling operation of the hardware components.

To achieve an IR transmission distance that is comparable to a two-cell battery remote, a voltage doubler is presented in this invention to double up the power while the remote control is in use. The voltage detector monitors the voltage pumped up by the voltage doubler. The software then judges the power being pumped up and adjusts the IR transmission power by turning on the transistors. This monitoring and control system can extend the battery life by setting the minimum power needed for achieving the required wireless transmission distance. Similar idea of placing the voltage doubler inside the microcontroller of an IR remote can be adapted to the microcontroller of a Bluetooth Low Energy (BLE) remote to significantly reduce the power consumption.

The objective of the invention is to save the cost of a battery in a remote controller while maintaining the same IR transmission distance being achieved by a two-cell battery remote.

According to a first aspect of the invention, a voltage doubler circuitry is designed to pump up the voltage provided by a single battery. It can be turned on or off according to the state of the remote.

According to a second aspect of the invention, a voltage-level detector is designed to monitor the voltage pumped up by the voltage doubler.

According to a third aspect of the invention, a number of built-in transistors, with individual switch in each transistor, are designed to provide the power needed to drive the IR signal by an IR transmission diode.

According to a fourth aspect of the invention, the software, implemented and executed by the CPU of the microcontroller, is used to control the first, second, and third aspects of this invention.

Figure 1:
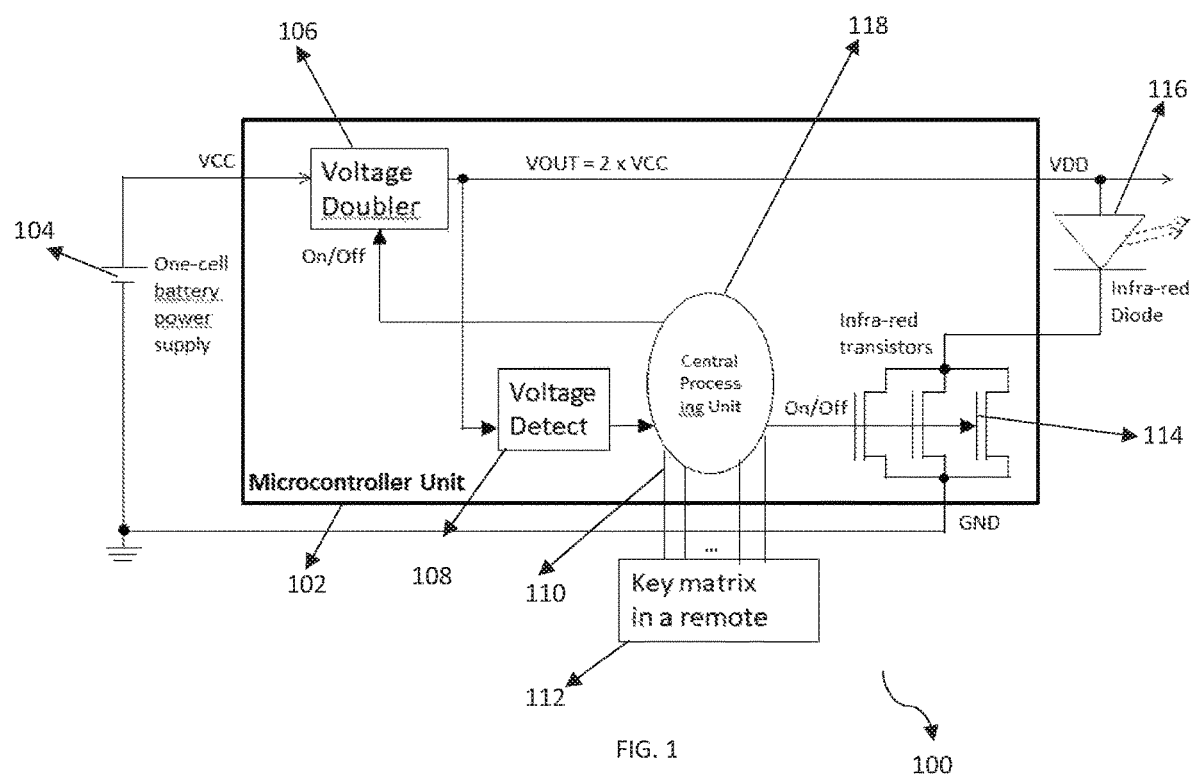
FIG. 1 illustrates an exemplary environment showing a block diagram of a microcontroller design for a one-cell battery IR remote control, in accordance with an embodiment of the present invention.

FIG. 1 shows a block diagram 100 of a microcontroller unit 102 for a one-cell battery remote 104. In an embodiment, the microcontroller unit 102 is for an Infrared (IR) remote, the microcontroller unit 102 comprises of one or more hardware components: a voltage doubler 106; a voltage detector 108; input and output pins 110 connecting keypads 112 of the remote; a high-power metal-oxide-semiconductor field-effect transistor (MOSFET) transmission gates 114 to drive an IR diode 116; and logic for a CPU 118 to control all the hardware components. Details will be explained for each component later on.

Figure 2:
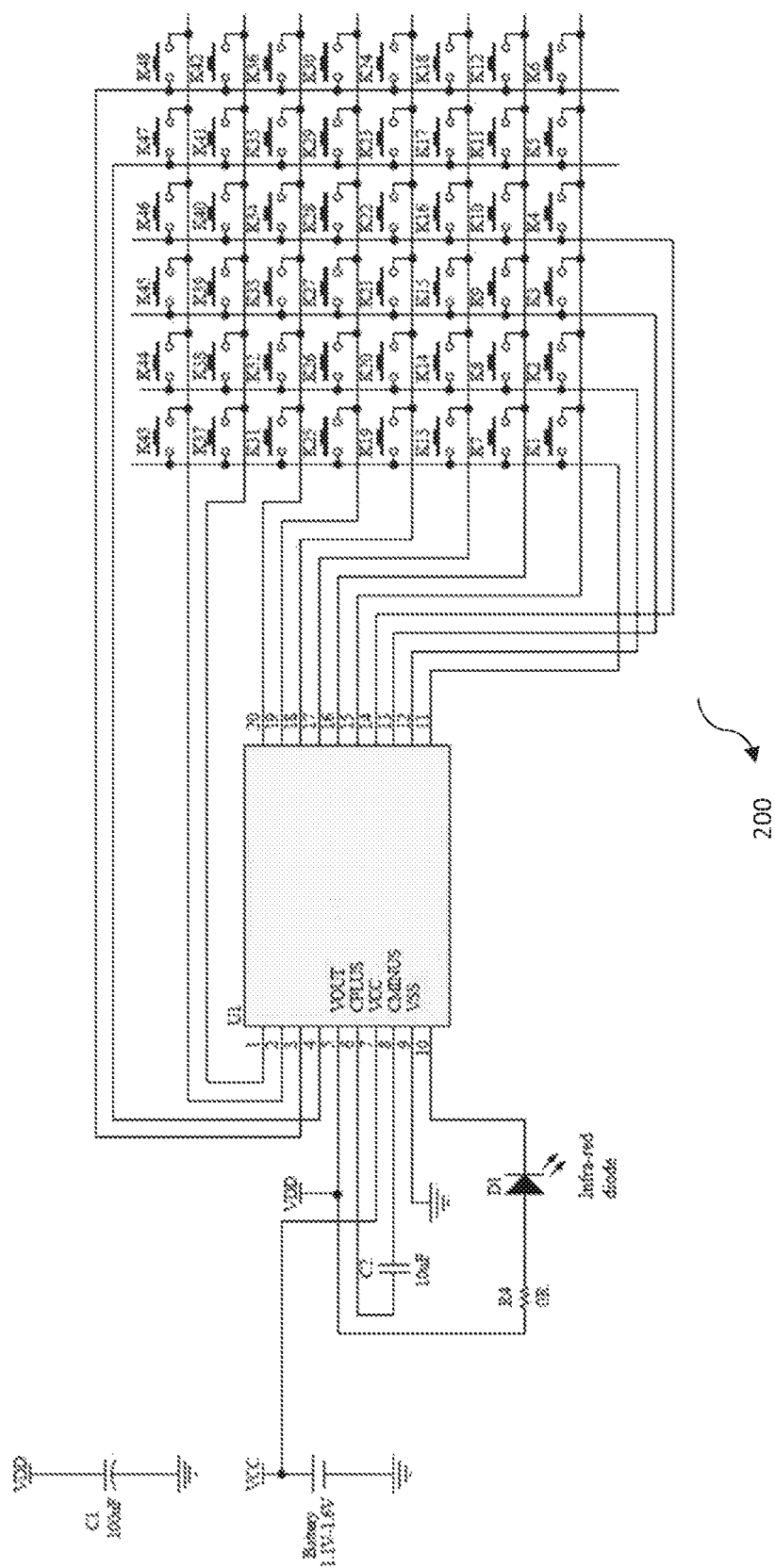
FIG. 2 illustrates an exemplary schematic circuit diagram of a one-cell battery IR remote control, in accordance with an embodiment of the present invention.

A reference schematic circuit diagram 200 of a one-cell battery remote control 104 is shown in FIG. 2. Remote keys are organized in a 6×8 matrix. A maximum of 48 remote keys are supported. 14 I/O pins are used to detect whether a remote key is pressed. The microcontroller unit 102 is in a 20-pin package. VSS is the ground pin. VCC is the power source of the single battery (typically 1.5V for a new battery). Two capacitors are needed in the circuitry. A capacitor of recommended value 10 µF is placed between CPLUS and CMINUS pins. It is needed to charge up the output to 2×Vcc. Another capacitor of recommended value 100 µF is placed between VOUT pin and VSS pin. It is used to provide smoothing to the output voltage to maintain a steady uniform power supply for the IR transmission diode and the rest of the microcontroller circuitry.

Figure 3:
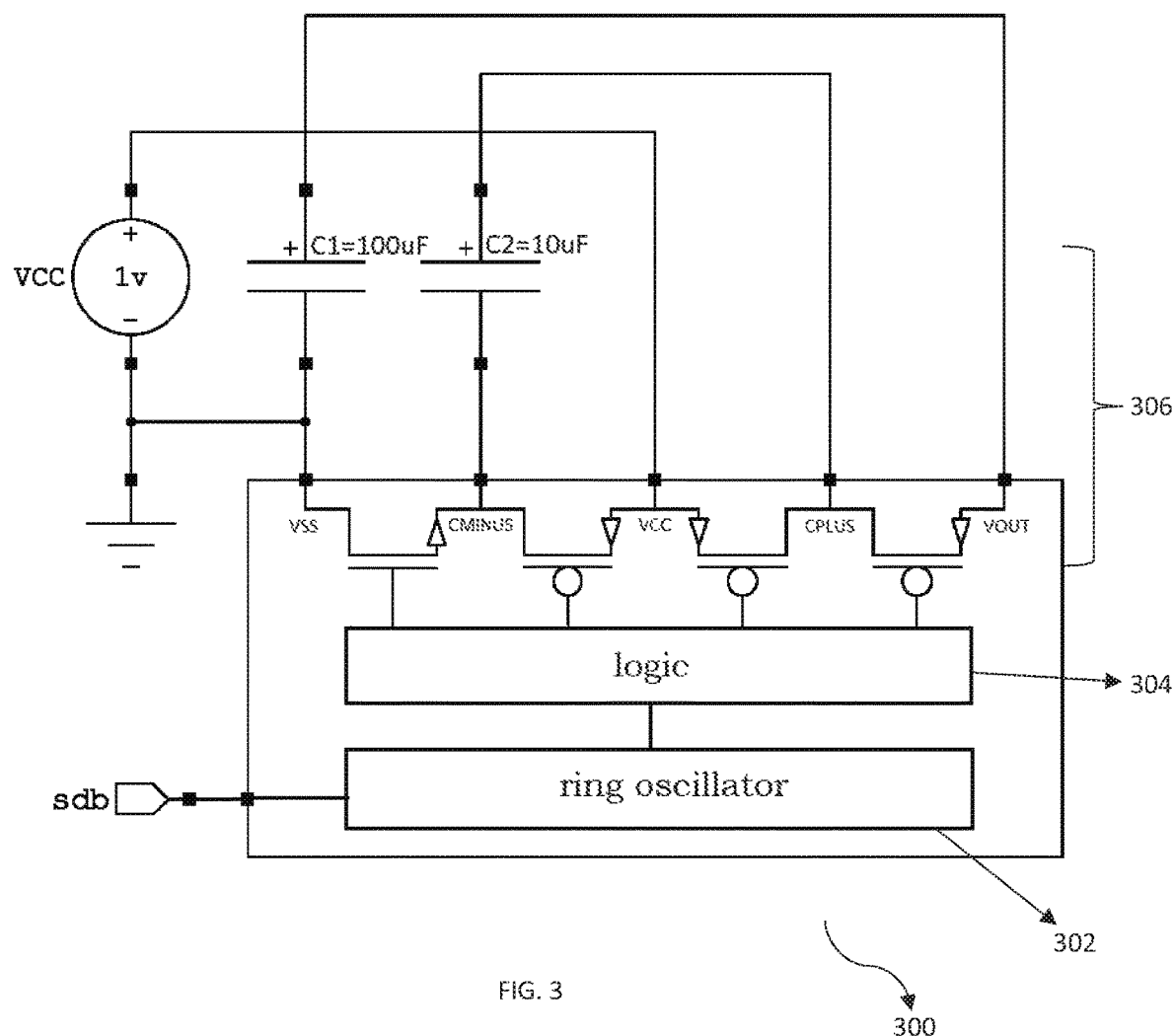
FIG. 3 illustrates an exemplary environment showing a schematic circuit design of a voltage doubler circuitry in a one-cell battery IR remote control, in accordance with an embodiment of the present invention.

The key component to extend the IR distance is the voltage doubler 106 because it can double the power supplied by the one-cell battery when remote is in use. Refer to FIG. 3 for an exemplary block diagram 300 of the voltage doubler 106. It is an analog integrated-circuit design. There are 5 inputs: (i) "VCC", the power signal which comes from the battery; (ii) "CPLUS", the positive terminal of the external 10 µF capacitor: (iii) "CMINUS", the negative terminal of the external 10 µF capacitor; (iv) "VSS", the common ground signal. (v) "sdb", a digital signal from the microcontroller which controls the on and off of the voltage doubler. Output is "VOUT", the output power signal providing power supply to the rest of the microcontroller.

In an embodiment, the voltage doubler design consists of three parts. The first part is the ring oscillator 302. It provides a typical output frequency of 200 kHz when the input control signal "sdb" is high. When "sdb" is low, the ring oscillator will stop its output oscillation. The oscillator is to provide a constant periodical switching signal source to the logic gates of the logic control unit to control the charge pump.

The second part of the voltage doubler is a logic control unit 304. It consists of logic gates which implement different gate control signals to the MOSFET transistors of the charge pump.

The third part of the voltage doubler is a one-stage charge pump 306. With a 1.5V power supply at VCC, two external capacitors C1=100 µF & C2=10 µF connected, and "sdb" signal is high, the logic control circuitry turns on four power transistors on and off sequentially to provide a 2×VCC output at VCC terminal. On the other hand, a logic zero input at "sdb" terminal will shut down the charge pump. In this case, VOUT will be shorted to VCC through a resistor around 1 kohm.

Voltage detector 108 is another analog integrated-circuit design which detects the VOUT provided by the voltage doubler 106. It has a bandgap reference circuitry inside which provides a constant and reliable voltage level. With resistor ladder built inside, it can detect VCC at certain range partitioned by hardware: (a) below 2.4V; (b) 2.4V-2.7V; and (c) higher than 2.7V.

Software resides either as a code in ROM or as flash inside the microcontroller unit 102. It may be apparent by a person skilled in the art that the software logic may reside in any conventional other method inside the remote control unit for controlling the operations of the remote unit, without deviating from the meaning and scope of the present invention. Logic of the CPU 118 is controlled by the software. It detects whether and when key pad is pressed by a user. When a key is pressed, it issues a high "sdb" signal to turn on the voltage doubler 106. After key pressing, it issues a low "sdb" signal to turn off the voltage doubler 106.

Figure 4:
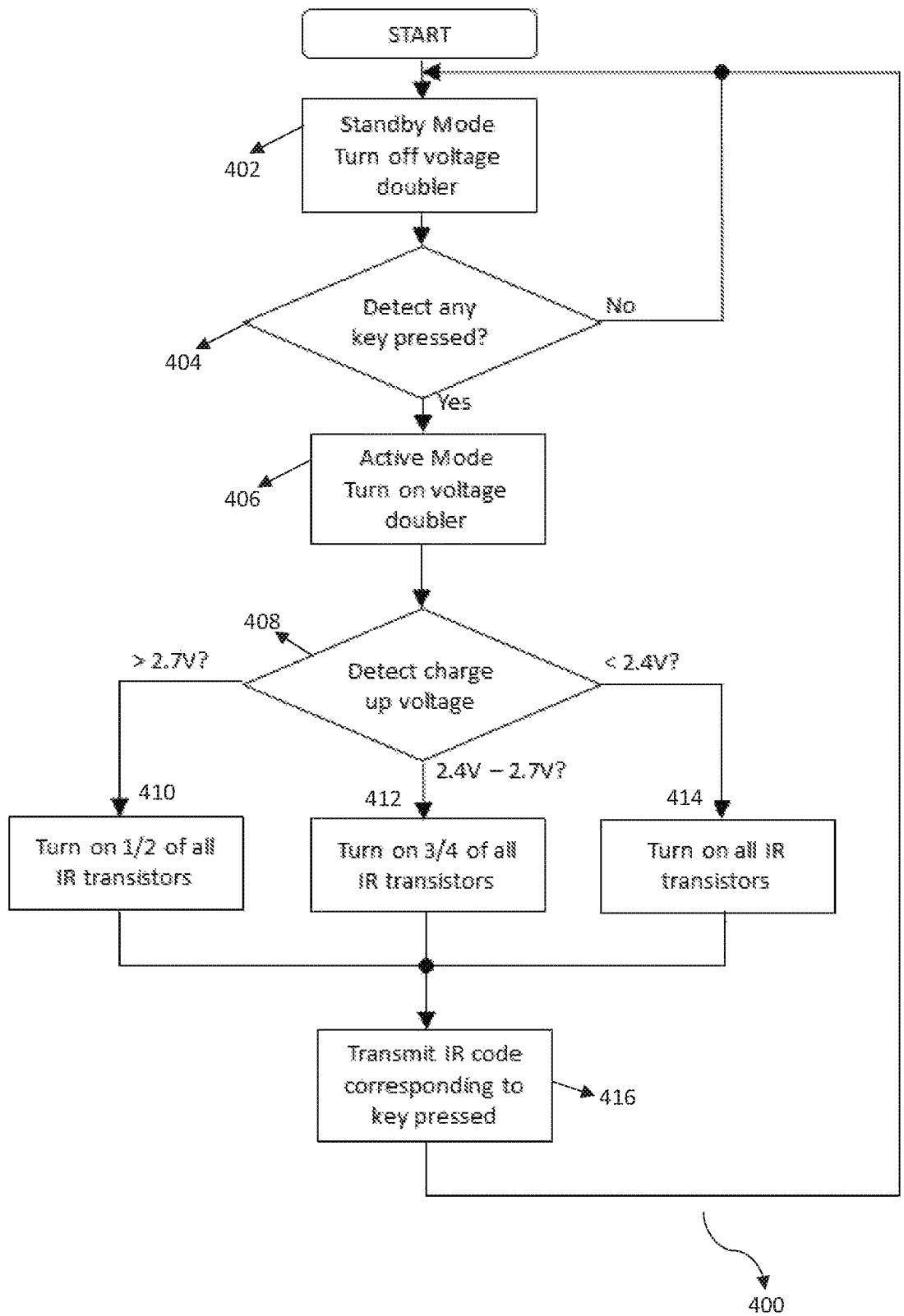
FIG. 4 illustrates an exemplary flow chart of a method of operation of a one-cell battery IR remote control, in accordance with an embodiment of the present invention.

FIG. 4 shows an exemplary flowchart 400 for showing the software implementation flow. The remote is started when battery is plugged in. After start-up initialization procedures, the software places the remote controller into a standby mode (at 402). Every component in the remote is in power-down mode, except the input interrupt logic for detecting whether a remote key is pressed. The power supply to the microcontroller circuitry is 1×VCC at the VOUT terminal of the voltage doubler 106.

When a user presses a key in the remote (at 404), the key-pressing interrupt will wake up the CPU. When it detects the key pressing is valid, the software will switch into run mode and wake up all components in the remote. During run mode, the voltage doubler is switched on (at 406).

The power supply to the microcontroller now becomes 2×VCC at the VOUT terminal of the voltage doubler 106. The voltage detector 108 is also running to detect the power being pumped up (at 408) by the voltage doubler 106. Three ranges of voltage detection can be set: (a) higher than 2.7V; (b) between 2.4V and 2.7V: (c) lower than 2.4V. If the voltage level is higher than 2.7V (at 410), the battery is new and fresh. The microcontroller does not need to turn on all the transistors in order to achieve the maximum allowed IR transmission distance. The software can turn on only 50% of the transistors to drive the IR diode. If voltage is in between 2.4V and 2.7V (at 412), the software turns on 75% of the transistors. If voltage level drops below 2.4V (at 414), then all transistors will be turned on to achieve maximum IR transmission power. Accordingly, a corresponding IR code is transmitted based on what key is pressed (at 416). When IR transmission is completed, the software will switch to standby mode to save the power consumption of the remote.

In another embodiment, the present invention of charging up the supply voltage to 2×VCC by voltage doubler while remote is in use, and retaining battery voltage at 1×VCC while remote is idle can be adopted to the microcontroller of any other short range wireless transmission control, such as including and not limited to Bluetooth Low-Energy (BLE) remote. The power consumption can be much reduced while only 1×VCC, instead of 2×VCC, is supplied to the microcontroller while the BLE remote is in idle state most of the time. It can also maintain the same power needed for radio frequency (RF) transmission as for a two-cell battery microcontroller while the BLE remote is in operation.

Figure 5:
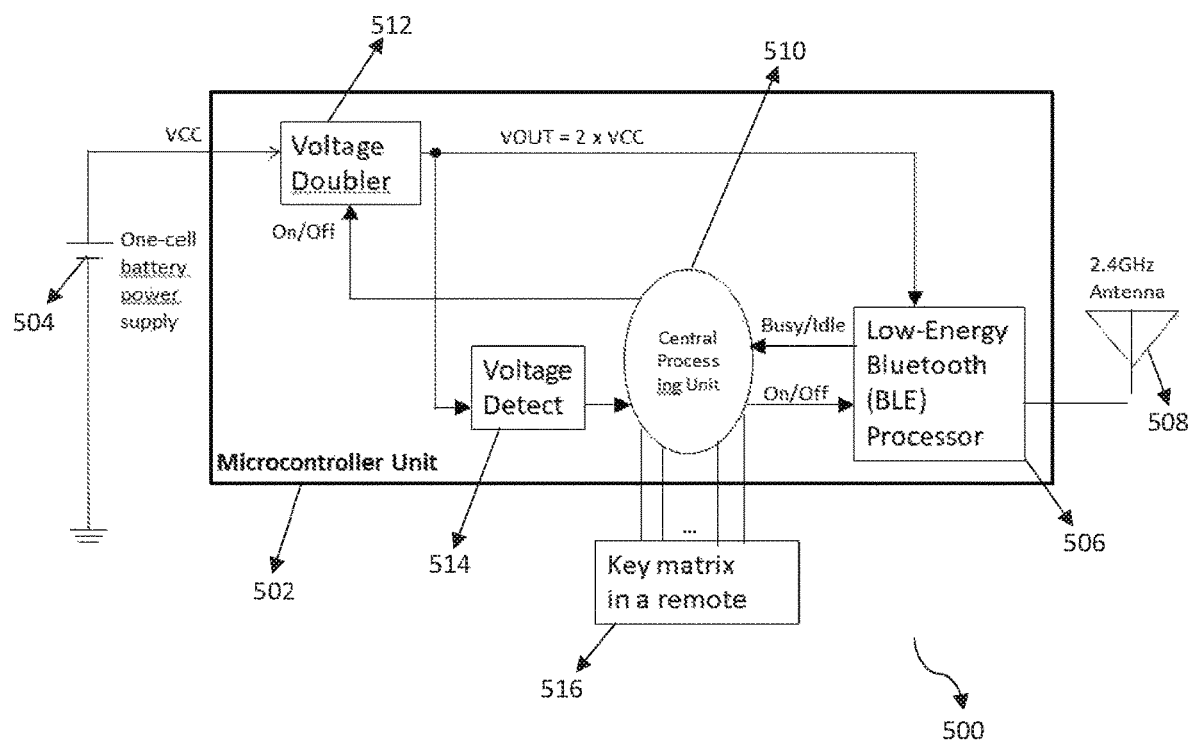
FIG. 5 illustrates an exemplary environment showing a block diagram of the microcontroller design for a one-cell battery BLE remote control, in accordance with an embodiment of the present invention.
Figure 6:
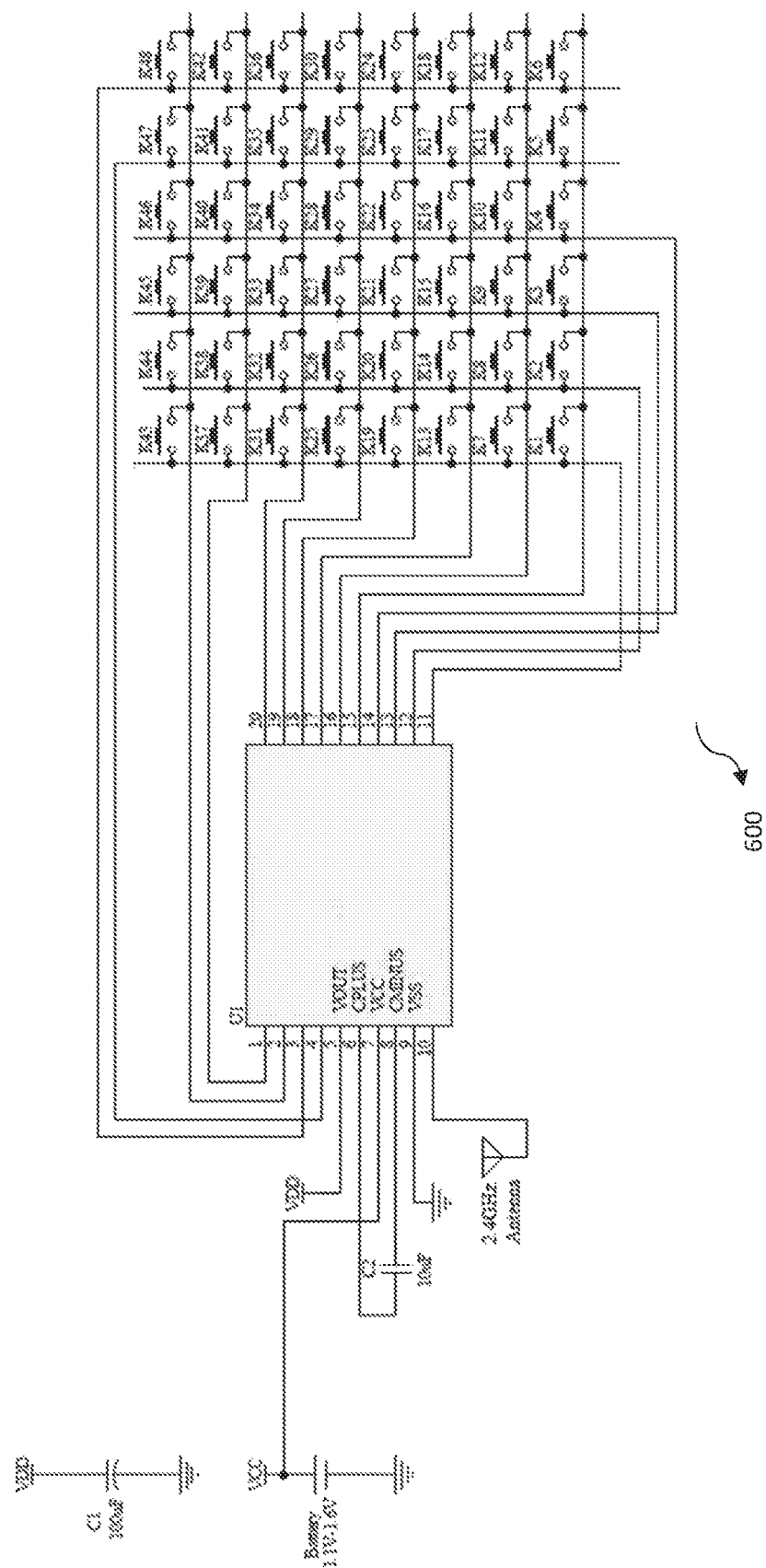
FIG. 6 illustrates an exemplary environment showing a schematic circuit design of a one-cell battery BLE remote control, in accordance with an embodiment of the present invention.

FIG. 5 shows an exemplary block diagram 500 of the microcontroller 502 for a one-cell battery BLE remote 504. FIG. 6 shows the schematic of a BLE remote. The hardware components of a BLE microcontroller are the same as the IR microcontroller, except that the built-in IR transistors are replaced by the BLE processor 506 capable of handling 2.4 GHz RF signals transmission and reception, and the external IR diode is replaced by a RF antenna 508. Another difference is that a "Busy/Idle" status is needed to indicate the status of the BLE processor 506 to the CPU 510. When the BLE processor is handling RF traffic, it needs the power to be doubled up. Therefore, it indicates the CPU that it is "busy". When RF transmission is over, it indicates the CPU that it is "idle", which allows the CPU to turn off the voltage doubler 512 and the voltage detector 514 until another key 516 is pressed.

Figure 7:
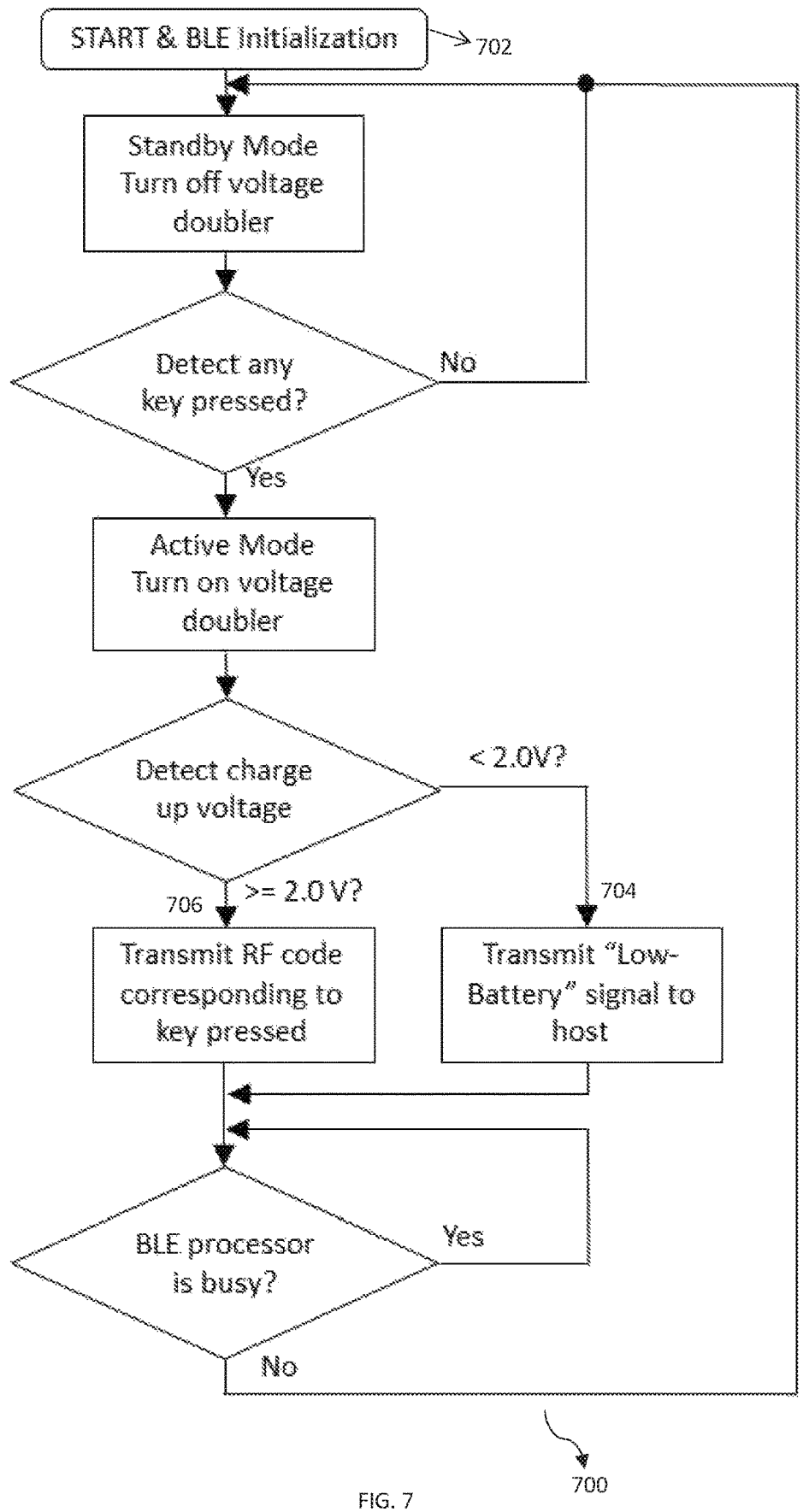
FIG. 7 illustrates an exemplary flow chart of a method of operation of a one-cell battery BLE remote control, in accordance with an embodiment of the present invention.

FIG. 7 shows a flowchart 700 for the software method flow that is implemented in a one-cell battery BLE remote microcontroller. Besides the setup, the remote keys and hardware settings, an initialization routine is needed for RF pairing and connection establishment of the remote with the host (TV, set top box, etc.) (702). During the BLE setup, the CPU is in active state. Internal power supply is pumped up to 2×VCC for RF operations.

Since most BLE processor comes with a regulator for maintaining a constant internal power supply, the voltage detector can serve another purpose to detect whether battery is in low-voltage condition or not. If internal power supply is lower than 2.0V (704), the software can indicate a "low-power battery" status in a BLE packet and notify the host through RF transmission.

During RF transmission, the CPU keeps monitoring the busy or idle status from the BLE processor. If "idle" is detected, the CPU can enter standby mode and turns off the voltage doubler to reduce the overall standby power consumption of the microcontroller. CPU then remains idle at 1×VCC power until another remote key is pressed, or another RF connection is needed. At 706, the remote control transmits the corresponding transmission code based on the key pressed.

In the summary, the hardware and software system design for a one-cell battery powered microcontroller in an IR remote is implemented to lengthen the IR transmission distance and save power consumption.

The key component consists of a voltage doubler which can pump up the input voltage from VCC to 2×VCC when the remote is in use, and original output 1×VCC when the remote is idle.

The apparatus should connect two external capacitors. One capacitor is placed across two external terminals for pumping up the voltage to 2×VCC. The other capacitor is connected across VOUT and ground to provide smoothing to the output.

The voltage doubler, consists of three parts: the oscillator, the logic control, and a one-stage charge pump. The oscillator provides constant periodic switching signals to the logic control.

The logic control provides gate input controls to the MOSFET transistors in charge pump. The charge pump consists of MOSFET transistors and external capacitors which charges up VCC to 2×VCC when turned on and maintains 1×VCC when turned off.

The voltage detector inside the IR hardware system design as claimed in claim 1, detects the voltage output pumped up by the voltage doubler.

Large MOSFET transistors, with individual switches controlled by software, are implemented to drive the external IR diode at different strength. Therefore, the IR transmission distance can be controlled.

When full battery is detected, some, not all, built-in transistors are turned on to allow less-than-maximum strength of IR power being used. This is to preserve battery power in order to achieve the allowed IR transmission distance.

A CPU is needed to control the key detection of the remote, the power of the voltage doubler, voltage detector, and the number of MOSFET transistors needed for IR transmission.

Software is implemented as described in FIG. 4, and resided as code in ROM or flash within the microcontroller to control the CPU of the one-cell battery IR remote.

The hardware and software system design for a one-cell battery powered microcontroller in an BLE remote is implemented to save power consumption.

ACRONYMS USED

BLE—Bluetooth Low Energy
CMINUS—Negative connection of the capacitor C2 in the remote controller
CPLUS—Positive connection of the capacitor C2 in the remote controller
CPU—central processing unit
IR—infra-red
MOSFET—metal-oxide-semiconductor field-effect transistor
RF—radio frequency
VCC—voltage level supplied by the battery of a remote controller
VOUT—voltage level output from the voltage doubler
VSS—ground connection of the remote controller

What is claimed is:

1. A microcontroller unit for a short-range wireless transmission in a one-cell battery powered remote control comprising:
    a voltage doubler for increasing an input voltage provided by the one-cell battery to increase distance of wireless transmission when the remote control is in use and for maintaining original output voltage when the remote control is idle; and
    a voltage detector for detecting voltage increased by the voltage doubler, wherein the voltage doubler includes:
    an oscillator to provide a constant periodical switching signal source to a logic control unit to control increase in the input voltage;
    the logic control unit to implement one or more logic gate control signals to multiple transistors included in a one-stage charge pump; and
    the one-stage charge pump including the multiple transistors and at least two external capacitors connected, and
wherein, when the voltage doubler is activated, the logic control unit turns on the multiple transistors on and off sequentially to increase the input voltage provided by the one-cell battery to increase the distance of the wireless transmission, and when the voltage doubler is deactivated, the original output voltage is maintained.

2. The unit of claim 1, wherein the microcontroller unit includes a CPU and a logic control of the CPU is controlled by software; and a diode for the wireless transmission, and wherein the CPU detects whether and when a key of the remote control is pressed by a user, and when the key is pressed, the CPU issues a high input control signal to activate the voltage doubler, and wherein the CPU issues a low input control signal to deactivate the voltage doubler, after the key is pressed.

3. The unit of claim 1, wherein the multiple transistors included in the one-stage charge pump are high power metal-oxide semiconductor field-effect transistors (MOSFET).

4. The unit of claim 1, wherein the voltage doubler increases the input voltage from the one-cell battery to twice its value, while the output voltage is maintained at a steady uniform power supply for a wireless transmission diode and other components of the microcontroller unit.

5. The unit of claim 1, wherein the voltage doubler includes an analog integrated-circuit that further includes a power signal input terminal from the one-cell battery; a positive terminal of the external capacitor; a negative terminal of the external capacitor; a common ground signal; and a digital input control signal from the microcontroller unit which controls on and off of the voltage doubler, and
    wherein the voltage detector includes an analog integrated-circuit design that detects output voltage provided by the voltage doubler, and wherein the voltage detector has a bandgap reference circuitry for providing a constant and reliable voltage level, and wherein the voltage detector includes a resistor ladder built inside for detecting the input voltage to the voltage doubler.

6. The unit of claim 5, wherein the oscillator provides a typical output oscillation frequency of 200 kHz when the digital input control signal from the microcontroller unit is high; and when the digital input control signal is low, the oscillator stops its output oscillation frequency.

7. The unit of claim 5, wherein the one-cell battery has a 1.5V power supply, and the one-stage charge pump includes the at least two external capacitors, one of 100 µF and other of 10 µF connected to each other; and wherein when the digital input control signal from the microcontroller unit is high, the logic control unit turns on the multiple transistors included in the one-state charge pump on and off sequentially to provide the increase in the input voltage, and wherein, a logic zero input at the digital input control signal shuts down the one-stage charge pump.

8. The unit of claim 1, wherein the microcontroller unit provides for the short-range wireless transmission in the one-cell battery powered remote control, and wherein the short-range wireless transmission either includes an Infrared transmission or a Bluetooth Low Energy transmission.

9. The unit of claim 1, wherein the voltage detector when detects the input voltage to the voltage doubler at a range of:
(a) below 2.4V, the voltage doubler turns on all the multiple transistors for increasing the input voltage at least twice and for achieving the distance of the wireless transmission in case of Infrared transmission; or indicates a "low-power battery" status in case of Bluetooth Low Energy transmission;
(b) 2.4V-2.7V, the voltage doubler turns on at least three by fourth of the multiple transistors for increasing the input voltage at least twice and for achieving the distance of the wireless transmission in case of Infrared transmission; and
(c) higher than 2.7V, the voltage doubler turns on at least half of the multiple transistors for increasing the input voltage at least twice and for achieving the distance of the wireless transmission in case of Infrared transmission, or the voltage doubler increases the input voltage at least twice for achieving the distance of the wireless transmission in case of Bluetooth Low Energy transmission.

10. A method for operating a short-range wireless transmission in a one-cell battery powered remote control comprising:
detecting, by a microcontroller unit included in the remote control, pressing of a key of the remote control;
activating a voltage doubler, included in the remote control, for increasing an input voltage provided by the one-cell battery to increase distance of wireless transmission when the remote control is in use and for maintaining original output voltage when the remote control is idle; and
detecting, by a voltage detector included in the remote control, voltage increased by the voltage doubler,
wherein for increasing, by the voltage doubler, the input voltage provided by the one-cell battery, the voltage doubler:
provides, by an oscillator included in the voltage doubler, a constant periodical switching signal source to a logic control unit, included in the voltage doubler, to control increase in the input voltage;
implements, at the logic control unit, one or more logic gate control signals to multiple transistors included in a one-stage charge pump of the voltage doubler; and
turns on, by the logic control unit, the multiple transistors on and off sequentially to increase the input voltage provided by the one-cell battery to increase the distance of the wireless transmission when the voltage doubler is activated, and
wherein the one-stage charge pump includes the multiple transistors and at least two external capacitors connected, and one of the at least two external capacitors is placed across two external terminals of the voltage doubler for increasing the input voltage, while the other capacitor is connected across an output voltage terminal and ground terminal to maintain the output voltage at a steady uniform power supply, and
wherein, when the voltage doubler is deactivated, the original output voltage is maintained at its value of the steady uniform power supply.

11. The method of claim 10, wherein the microcontroller unit further includes a CPU and a logic control of the CPU is controlled by software; and a diode for the wireless transmission, and wherein the method further includes:
detecting, by the CPU whether and when the key of the remote control is pressed by a user;
issuing, by the CPU, a high input control signal to activate the voltage doubler when the key is pressed; and
issuing, by the CPU, a low input control signal to deactivate the voltage doubler, after the key is pressed.

12. The method of claim 10, wherein the multiple transistors included in the one-stage charge pump are high-power metal-oxide-semiconductor field-effect transistors (MOSFET).

13. The method of claim 10, wherein the voltage doubler increases the input voltage from the one-cell battery to twice its value, and the output voltage is maintained at its value of the steady uniform power supply for a wireless transmission diode and other components of the microcontroller unit.

14. The method of claim 10, wherein the voltage doubler includes an analog integrated-circuit that further includes a power signal input terminal from the one-cell battery; a positive terminal of the external capacitor; a negative terminal of the external capacitor; a common ground signal; and a digital input control signal from the microcontroller unit which controls on and off of the voltage doubler, and
wherein the voltage detector includes an analog integrated-circuit design that detects output voltage provided by the voltage doubler, and wherein the voltage detector has a bandgap reference circuitry for providing a constant and reliable voltage level, and wherein the voltage detector includes a resistor ladder built inside for detecting the input voltage to the voltage doubler.

15. The method of claim 14, wherein the oscillator provides a typical output oscillation frequency of 200 kHz when the digital input control signal from the microcontroller unit is high; and when the digital input control signal is low, the oscillator stops its output oscillation frequency.

16. The method of claim 14, wherein the one-cell battery has a 1.5V power supply, and the one-stage charge pump includes the at least two external capacitors, one of 100 µF and other of 10 µF connected to each other; and wherein when the digital input control signal from the microcontroller unit is high, the logic control unit turns on the multiple transistors included in the one-state charge pump on and off sequentially to provide the increase in the input voltage, and wherein, a logic zero input at the digital input control signal shuts down the one-stage charge pump.

17. The method of claim 10, wherein the microcontroller unit provides for the short-range wireless transmission in the one-cell battery powered remote control, and wherein the short-range wireless transmission either includes an Infrared transmission or a Bluetooth Low Energy transmission.

18. The method of claim 10, wherein the voltage detector when detects the input voltage to the voltage doubler at a range of:
(a) below 2.4V, the voltage doubler turns on all the multiple transistors for increasing the input voltage at least twice and for achieving the distance of the wireless transmission in case of Infrared transmission; or indicates a "low-power battery" status in case of Bluetooth Low Energy transmission;
(b) 2.4V-2.7V, the voltage doubler turns on at least three by fourth of the multiple transistors for increasing the input voltage at least twice and for achieving the distance of the wireless transmission in case of Infrared transmission; and
(c) higher than 2.7V, the voltage doubler turns on at least half of the multiple transistors for increasing the input voltage at least twice and for achieving the distance of the wireless transmission in case of Infrared transmission, or the voltage doubler increases the input voltage at least twice for achieving the distance of the wireless transmission in case of Bluetooth Low Energy transmission.

* * * * *